United States Patent
Banerjee et al.

(10) Patent No.: US 12,001,840 B1
(45) Date of Patent: Jun. 4, 2024

(54) LIKELIHOOD RATIO TEST-BASED APPROACH FOR DETECTING DATA ENTRY ERRORS

(71) Applicant: Intuit, Inc., Mountain View, CA (US)

(72) Inventors: Arkadeep Banerjee, Bangalore (IN); Vignesh T. Subrahmaniam, Bangalore (IN)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/122,627

(22) Filed: Mar. 16, 2023

(51) Int. Cl.
*G06F 9/30* (2018.01)
*G06F 9/54* (2006.01)

(52) U.S. Cl.
CPC ............ *G06F 9/3001* (2013.01); *G06F 9/545* (2013.01)

(58) Field of Classification Search
CPC ................................ G06F 9/3001; G06F 9/545
See application file for complete search history.

(56) References Cited

U.S. PATENT DOCUMENTS

| | | | | |
|---|---|---|---|---|
| 5,956,634 A * | 9/1999 | Otterson | ............. | H04W 12/126 455/410 |
| 8,910,188 B1 * | 12/2014 | Wang | ....................... | G06F 9/542 719/318 |
| 9,470,775 B1 * | 10/2016 | Baggenstoss | ............. | G01S 5/20 |
| 2005/0080769 A1 * | 4/2005 | Gemmell | ............ | G06F 16/9038 707/999.102 |
| 2007/0140551 A1 * | 6/2007 | He | .......................... | G06F 18/00 382/137 |
| 2009/0060095 A1 * | 3/2009 | Aggarwal | ........... | G06F 18/2155 375/341 |
| 2011/0218980 A1 * | 9/2011 | Assadi | ................... | G06Q 10/10 707/700 |
| 2012/0004116 A1 * | 1/2012 | Tsao | .................. | G01N 33/57423 435/6.12 |
| 2013/0046531 A1 * | 2/2013 | Chandramouli | ....... | G06F 40/216 704/9 |
| 2015/0272527 A1 * | 10/2015 | Narayanan | ........... | A61B 6/4241 382/131 |
| 2017/0323331 A1 * | 11/2017 | Malek | ................ | G06Q 30/0246 |
| 2020/0073992 A1 * | 3/2020 | Grosset | ................. | G06F 16/258 |

* cited by examiner

*Primary Examiner* — Farley Abad
(74) *Attorney, Agent, or Firm* — Dinsmore & Shohl LLP

(57) ABSTRACT

Certain aspects of the present disclosure provide techniques for detecting data errors. A method generally includes receiving a new value as user input for a data field, generating histogram-based approximations of kernel density estimates generated based on valid data and invalid data associated with the data field, determining a likelihood that the new value is a valid value and a likelihood that the new value is an invalid value, computing a likelihood ratio test statistic based on a ratio of the likelihoods, and classifying the new value as valid or invalid based on comparing the likelihood ratio test statistic to a likelihood ratio test threshold.

18 Claims, 7 Drawing Sheets

LIKELIHOOD RATIO TEST-BASED APPROACH FOR DETECTING DATA ENTRY ERRORS

INTRODUCTION

Aspects of the present disclosure relate to detecting data errors, and in particular to training and using a likelihood ratio test to detect data errors in numeric data.

BACKGROUND

Manual data entry is a ubiquitous task in many different data processing contexts, including engineering, healthcare, education, government, mathematics, and finance, to name a few. However, a notable problem with manual data entry is the inevitability of mistakes, such as mistyped words and numbers, which may in-turn lead to mistaken processing. Best intentions aside, even the most meticulous individuals make occasional data entry mistakes.

While data entry errors may seem routine and mostly innocuous in day-to-day life, in high-risk industries (e.g., healthcare, finance, engineering, science, transportation, etc.), a data entry error may lead to serious injury, loss of life, loss of assets, destruction of property, legal liability, and the like. Accordingly, there is a need for a technical solution for detecting data entry errors so that they can be corrected and bad outcomes can be avoided.

Conventional approaches for detecting data entry errors have focused on non-numeric type data types. For example, a spell checking function may check a word entered in an application (e.g., in a data field) against a reference dictionary to determine whether the word is spelled correctly. However, dictionary-based spell checking can still fail to detect word-based errors where, for example, a correctly spelled word is nevertheless the wrong word for the context. For example, the words "there," "their," and "they're" are notoriously misused, and spell checking will not catch these context-type errors. Another approach is to constrain data entry, such as by using a list of available entry options (e.g., a drop-down list). However, such approaches significantly constrain the range of input data values possible and thus are not a realistic solution for many data processing contexts.

Techniques for detecting errors in numeric data present a more difficult technical problem. Approaches for detecting errors in non-numeric data, such as dictionary-based approaches, are generally unsuitable for numeric data types. And constraining the range of input data is often not workable for precise numeric data. Further, performing manual checks of numeric data is infeasible beyond the very small scale and often just as error prone as the original data entry. Thus a technical problem exists in the art of how to detect errors in numeric data, such as numeric data entered into a data processing application.

Accordingly, improved techniques for detecting errors in numeric data are needed.

SUMMARY

Certain embodiments provide a method for detecting data entry errors. The method generally includes receiving a new value as user input for a data field. The method generally includes generating histogram-based approximations of kernel density estimates generated based on valid data and invalid data associated with the data field. The method generally includes determining a likelihood that the new value is a valid value and a likelihood that the new value is an invalid value based on the histogram-based approximations. The method generally includes computing a likelihood ratio test statistic based on a ratio of the likelihood that the new value is the valid value to the likelihood that the new value is the invalid value. The method generally includes classifying the new value as valid or invalid based on comparing the likelihood ratio test statistic to a likelihood ratio test threshold.

Certain embodiments provide a method of training a likelihood ratio test to detect data errors. The method generally includes determining mean values for valid data associated with a data field. The method generally includes determining a log ratio of each individual valid datum in the valid data to a corresponding mean value of the means values determined for the valid data. The method generally includes generating invalid data associated with the data field. The method generally includes determining a log ratio for each individual invalid datum in the invalid data to a corresponding mean value of the mean values determined for the valid data. The method generally includes generating a first kernel density estimate based on the log ratio of each individual valid datum in the valid data. The method generally includes generating a second kernel density estimate based on the log ratio of each individual invalid datum in the invalid data. The method generally includes computing likelihood ratio test statistics for test data based on a ratio of a likelihood that each test datum is valid to a likelihood that each test datum is an invalid based on the first kernel density estimate and the second kernel density estimate. The method generally includes optimizing a likelihood ratio test statistic based on the likelihood ratio test statistics for the test data and a type 1 error value.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
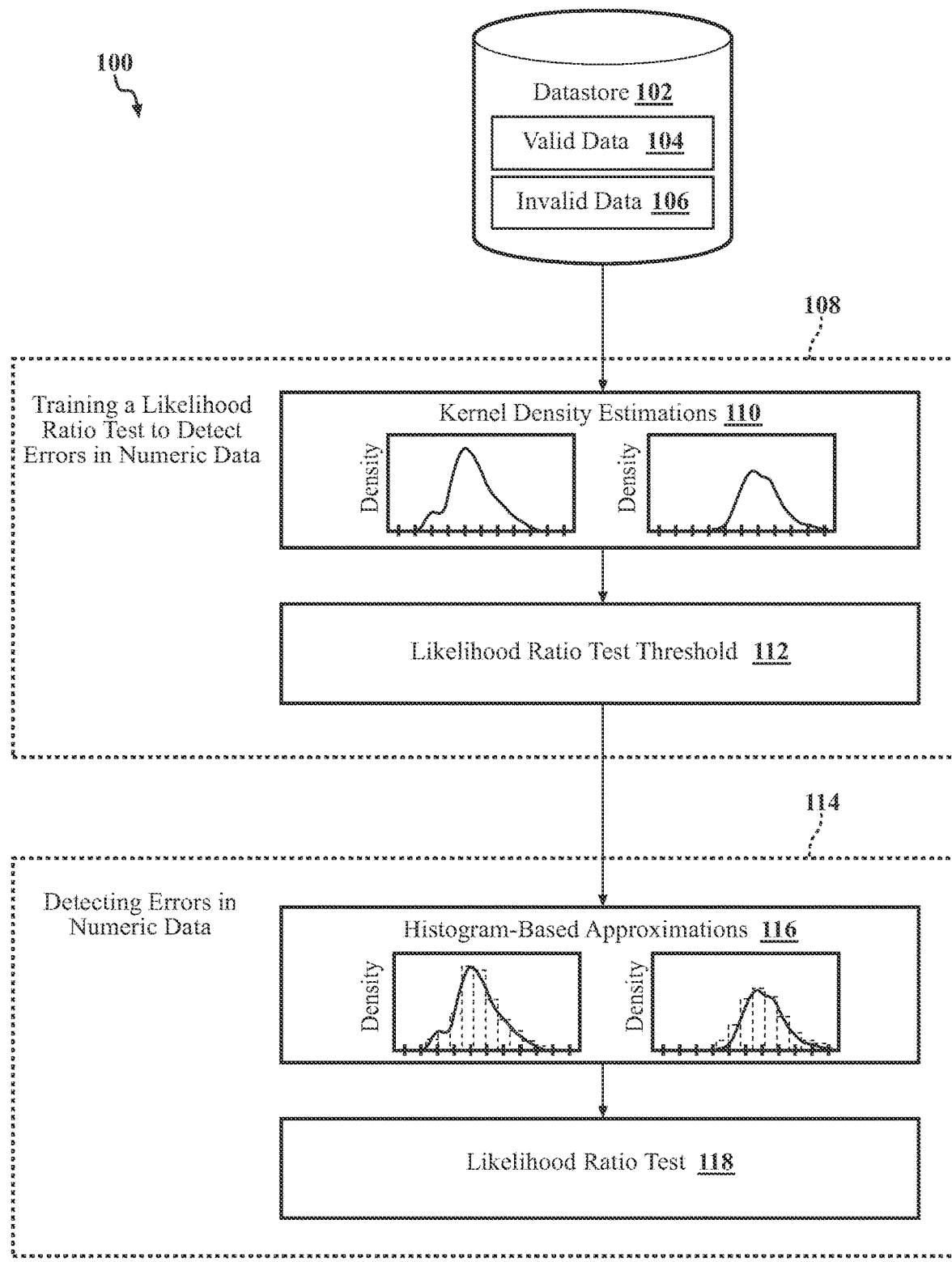
FIG. 1A illustrates an example system for training and using a likelihood ratio test to detect errors in numeric data.

Detecting errors in numeric data (e.g., for numeric data entered into an application for processing) is a technically challenging problem. One aspect of the technical problem is that many types of numeric data entry errors exist, which are generally not detectable using known techniques-especially those techniques designed for non-numeric data.

One example of a numeric data entry error is a transposition error, which occurs when a string of numbers is encoded in the wrong order, such as "101" instead of "110". Another example of a numeric data entry error is a duplication error, which occurs when a number is erroneously entered more than once, such as "100" instead of "10." Yet another example of a numeric data entry error is an omission error, which occurs when a number in a string of numbers is omitted, such as "10" instead of "100". A further example of a numeric data entry error is a substitution error, which occurs when a number in a string of numbers is erroneously substituted for another number, such as "120" instead of "110." These are some examples of typographical errors, but other types of numeric errors exist. For example, a logical error may occur when cutting and pasting an otherwise correct numeric value into an incorrect data field (e.g., pasting a zip code in a salary field).

As above, manually checking whether each number in a string of numbers entered into a data field is correct prior to performing data processing is cumbersome, time-consuming, and generally impractical for any large scale data processing. In fact, for large data sets, the technical problem is intractable when considering manual (e.g. human-based mental process) approaches. When a data set is sufficiently large, it could take a human longer than its lifetime to check all the numeric data entries.

Further, other conventional approaches, such as Z-tests and outlier detection, for detecting errors in numeric data may rely on assumptions that are not valid for many types and/or sets of numeric data. For example, numeric hypothesis testing is generally based on an assumption that each numeric data instance being tested is independently and identically distributed (IID), which is decidedly untrue for many data fields. For example, a time series of numeric data values, such as a person's year-to-date pay from one month to the next, would not be IID.

As yet another technical issue, numeric data errors may have low divergence from a population of data in which they reside. For example, "12345" has a statistically small divergence from "12354" despite a high probability of occurring in data entries due to human factors, such as the numbers '4' and '5' being adjacent to each other on keyboards and number pads used for data entry. Even when there is a large divergence from a population, the divergent data may in fact be valid. For example, if a person's pay is $10,000 per month for months January through November and then $19,000 for December, the December value appears both statistically divergent and easily explainable based on a common typographical error of substituting adjacent numbers '9' and '0' on a keyboard. However, December's pay may have included a bonus of $9,000 and therefore be valid despite all of the indications of it being an error based on conventional error detecting techniques.

Accordingly, conventional methods for detecting errors in numeric data, such as Z-tests, outlier detection, and other rule-based approaches, are not effective for detecting numeric data errors in many contexts.

Embodiments described herein overcome these technical problems by providing an approach for detecting errors in numerical data which utilizes a likelihood ratio test in conjunction with a modified kernel density estimation. In particular, as illustrated in FIG. 1A, a system 100 is provided for training a likelihood ratio test to detect errors in numeric data (e.g., at 108) and further detecting errors in numeric data using the likelihood ratio test (e.g., at 114). Training a likelihood ratio test to detect errors in numeric data, at 108, involves generating kernel density estimates 110 based on valid data 104 and invalid data 106 associated with a data field(e.g., in datastore 102) and determining a likelihood ratio test threshold 112, k, that is to be used for classifying numerical values as valid or invalid. Additional details regarding training a likelihood ratio test are provided below with respect to FIGS. 2A and 2B. Detecting errors in numeric data, at 110, involves generating histogram-based approximations of kernel density estimates generated based on valid data 104 and invalid data 106 and performing a likelihood ratio test 118, using the histogram-based approximations 116, to classify a numerical value (e.g., entered in a data field of an application) as valid or invalid. Additional details regarding detecting errors in numeric data using a likelihood ratio test are provided below with respect to FIGS. 3A and 3B.

Brief Introduction to a Likelihood Ratio Test

A likelihood ratio is a statistic expressing the relative likelihood of some data given two competing models. The likelihood ratio, LR, (also referred to herein as the "likelihood ratio statistic") can be written as:

$$LR = \frac{L(\theta_0)}{L(\theta_\alpha)}$$

where, $L(\theta_0)$ is the likelihood of a null hypothesis ($H_0$: $\theta=\theta_0$) being correct, and is calculated as:

$$L(\theta_0)=f_n(X_1,X_2,\ldots,X_n|\theta_0)$$

and $L(\theta_\alpha)$ is the likelihood of an alternate hypothesis ($H_\alpha$: $\theta=\theta_\alpha$) being correct, and is calculated as:

$$L(\theta_\alpha)=f_n(X_1,X_2,\ldots,X_n|\theta_\alpha)$$

where $f_n(X_1, X_2, \ldots, X_n|\theta_0)$ is a probability density distribution for a random sample, $X_1, X_2, \ldots, X_n$, with a parameter $\theta$. A null hypothesis ($H_0$: $\theta=\theta_0$) is a statement about a population that is assumed to be true unless it can be shown to be incorrect, while an alternate hypothesis ($H_\alpha$: $\theta=\theta_\alpha$) is a claim about the population that is contradictory to $H_0$ and is concluded when $H_0$ is rejected.

If the null hypothesis is true, there is a $(1-\alpha)$ probability that the likelihood ratio test correctly accepts the null hypothesis. Probability $(1-\alpha)$ represents a confidence level of accepting the null hypothesis when the null hypothesis is true, where variable $\alpha$ is the probability of a type I error (e.g., false-positive error) occurring, or more specifically, a probability of rejecting the null hypothesis when the null hypothesis is, in fact, true. On the other hand, if the null hypothesis is false, there is a $(1-\beta)$ probability that test correctly rejects the null hypothesis (in favor of the alternate hypothesis). Variable R (referred to herein as the "probability of a type II error") is the probability of failing to reject the null hypothesis and, as such, accepting the null hypothesis (e.g., probability of a false-negative error). The "power" (1−β) of a hypothesis test is the probability that the test correctly rejects the null hypothesis when the alternate hypothesis is the hypothesis that is true.

Brief Introduction to Kernel Density Estimation

Kernel density estimation is the application of kernel smoothing for probability density estimation, i.e., a non-parametric method to estimate the probability density function of a random variable using kernels as weights. A kernel, such as a Gaussian kernel, is generally a positive function controlled by a bandwidth parameter, h. Kernel density estimation works by creating a kernel density estimate, which may be represented as a curve or complex series of curves. In some embodiments, the kernel density estimate is calculated by weighting the distance of all the data points in each specific location along the distribution. If there are more data points grouped locally, the estimation is higher. The kernel function is the specific mechanism used to weigh the data points across the data set. The bandwidth, h, of the kernel acts as a smoothing parameter, controlling the tradeoff between bias and variance in the result. For example, a low value for bandwidth, h, may estimate density with a high variance, whereas a high value for bandwidth, h, may produce larger bias. Bias refers to the simplifying assumptions made to make a target function easier to approximate. Variance is the amount that the estimate of the target function will change, given different data.

Likelihood Ratio Test-Based Approach Utilizing a Modified Kernel Density Estimation for Detecting Numeric Data Errors According to embodiments described herein, a likelihood ratio statistic may be calculated for a numerical value associated with a data field (e.g., a new value received as user input for a data field). The likelihood ratio statistic for the numerical value is based on a ratio of a likelihood that the numerical value is a valid value to a likelihood that the numerical value is an invalid value. The likelihood that the numerical value is a valid value is determined using a histogram-based approximation of a kernel density estimate generated based on valid data associated with the data field. Valid data may include correct numerical values previously entered for the data field.

Similarly, the likelihood that the numerical value is an invalid value is determined using a histogram-based approximation of a kernel density estimate generated based on invalid data associated with the data field. Invalid data may include artificially-generated (e.g., synthetic) values with errors that are known to occur and therefore are predictable, such as the various typographical errors discussed above (e.g., transposition errors, duplication errors, omission errors, substitution errors, and others) as well as logical errors.

A histogram-based approximation is a chart that plots the probability density distribution of numeric values as a series of bars. In other words, a histogram is an alternative to a density curve, or kernel density estimate (e.g., which gives each data point a continuous contribution to a distribution). Each bar typically covers a range of numeric values called a bin or class; a bar's height indicates the frequency of data points with a value within the corresponding bin. Using histogram-based approximations of kernel density estimates, as opposed to the kernel density estimates themselves, for determining the likelihood that the numerical value is valid or invalid helps to save significant compute resources by not having to continuously re-calculate the kernel density estimates, which would require a large amount of expensive compute operations, such as multiplications.

The likelihood ratio statistic calculated for the numerical value associated with the data field is used to classify the numerical value as valid or invalid by comparing the likelihood ratio statistic to a likelihood ratio test threshold, k. In some embodiments, described herein, the likelihood ratio test threshold, k, is chosen using a Neyman-Pearson Lemma test. More specifically, the likelihood ratio test threshold, k, is chosen such that the null hypothesis $H_0$: $\theta=\theta_0$ against the alternate hypothesis $H_\alpha$: $\theta=\theta_\alpha$, maximizes the "power" of the test (1−β) while keeping the probability of a type I error below or equal to a desired type I error value (α) (e.g., such that the likelihood ratio test is the most powerful test for a given false positive rate).

As such, when comparing the likelihood ratio statistic to a likelihood ratio test threshold, k, the numerical value is classified as valid when:

$$\frac{L(\theta_0)}{L(\theta_\alpha)} \geq k$$

and the numerical value is classified as invalid when:

$$\frac{L(\theta_0)}{L(\theta_\alpha)} < k$$

where $L(\theta_0)$ is the likelihood of the numerical value not belonging to the error population and $L(\theta_\alpha)$ is the likelihood of the numerical value belonging to the error population.

The likelihood ratio test-based approach for data error detection described herein provides significant technical advantages over conventional solutions, such as improved error detection accuracy for numeric data types and the ability to perform error detection on a wider variety of input data. These technical effects overcome technical problems of low error detection accuracy and limited data processing capabilities in conventional approaches.

Further, the error detection approach's use of histogram-based approximations when computing the likelihood ratio statistic improves the efficiency of detecting errors in numerical data (e.g., data entries entered into an application). In particular, the technical effect of using a histogram-based approximation, as opposed to re-calculating kernel density estimates each time a new value is to be classified as valid or invalid, is the ability to reduce consumption of compute resources while increasing efficiency of the overall likelihood ratio test, which may be especially important for real-time applications (e.g., to provide almost feedback regarding the validity of a numerical value, for example, entered in a data field).

Notably, the improved error detection statistical approach described herein can further improve the function of any existing application that processes numeric data. For example, any application that includes numeric data fields and/or numeric data fields. In some cases, a numeric data instance can be checked after entry and can be indicated as a potential error to a user if the likelihood ratio statistic calculated for the entry exceeds the determined likelihood ratio test threshold, k. In this way, the user receiving the indication can correct the numeric data and avoid any problems that would have otherwise been created by the error. Thus, the indication generated based on the error detection approach, a further technical effect of the approaches described herein, can beneficially help to avoid a wide range of significant harms.

In certain embodiments, a method of training a likelihood ratio test to detect data errors is provided. A first part of training the likelihood ratio test involves determining the likelihood ratio test threshold, k, that is to be used for classifying numerical values as valid or invalid. A second part of training the likelihood ratio test involves generating the kernel density estimate based on valid data associated with the data field and the kernel density estimate based on invalid data associated with the data field. The generated kernel density estimates may be used to create histogram-based approximations for purposes of efficiently classifying numerical values as valid or invalid (e.g., based on a histogram-based approximation of each kernel density estimate).

As described in more detail below, training a likelihood ratio test to detect data errors for a data field involves applying a kernel function to valid and invalid data, associated with the data field, and to thereby approximate a kernel density estimate for the valid data (e.g., "the non-error population") and a kernel density estimate for the invalid data (e.g., "the error population"), respectively. More specifically, a log ratio of each valid datum in the valid data to a corresponding mean value calculated for each valid datum is determined and a first kernel density estimate is generated based on such log ratios. Similarly, a log ratio of each invalid datum in the invalid data to a corresponding mean value calculated using a subset of the valid data is determined and a second kernel density estimate is generated based on such log ratios.

For a data point y, the kernel density estimate is computed as:

$$\rho_K(y) = \sum_{i=1}^{N} K(y - x_i; h)$$

where $$K(x; h) \propto \exp\left(-\frac{x^2}{2h^2}\right)$$

and h is the bandwidth parameter.

The created kernel density estimate for the valid data (e.g., "the non-error population") and for the invalid data (e.g., "the error population") are used to compute likelihood ratio statistics (e.g., $$\frac{L(\theta_0)}{L(\theta_\alpha)})$$

for test data. Test data includes both known valid and invalid data for the data field used to optimize a likelihood ratio statistic. For example, the non-error population distribution is used to determine a likelihood that each test datum is valid, and the error population distribution is used to determine a likelihood that each test datum is invalid. A likelihood ratio statistic is optimized based on the likelihood ratio test statistics computed for the test data and a desired type I error value ($\alpha$). In other words, the likelihood ratio test statistics computed for the test data may be used to determine a value of the likelihood ratio test threshold, k, such that the power ($1-\beta$) of the test is maximized subject to the desired type I error probability ($\alpha$).

Statistical Power of a Hypothesis Test

Figure 1B:
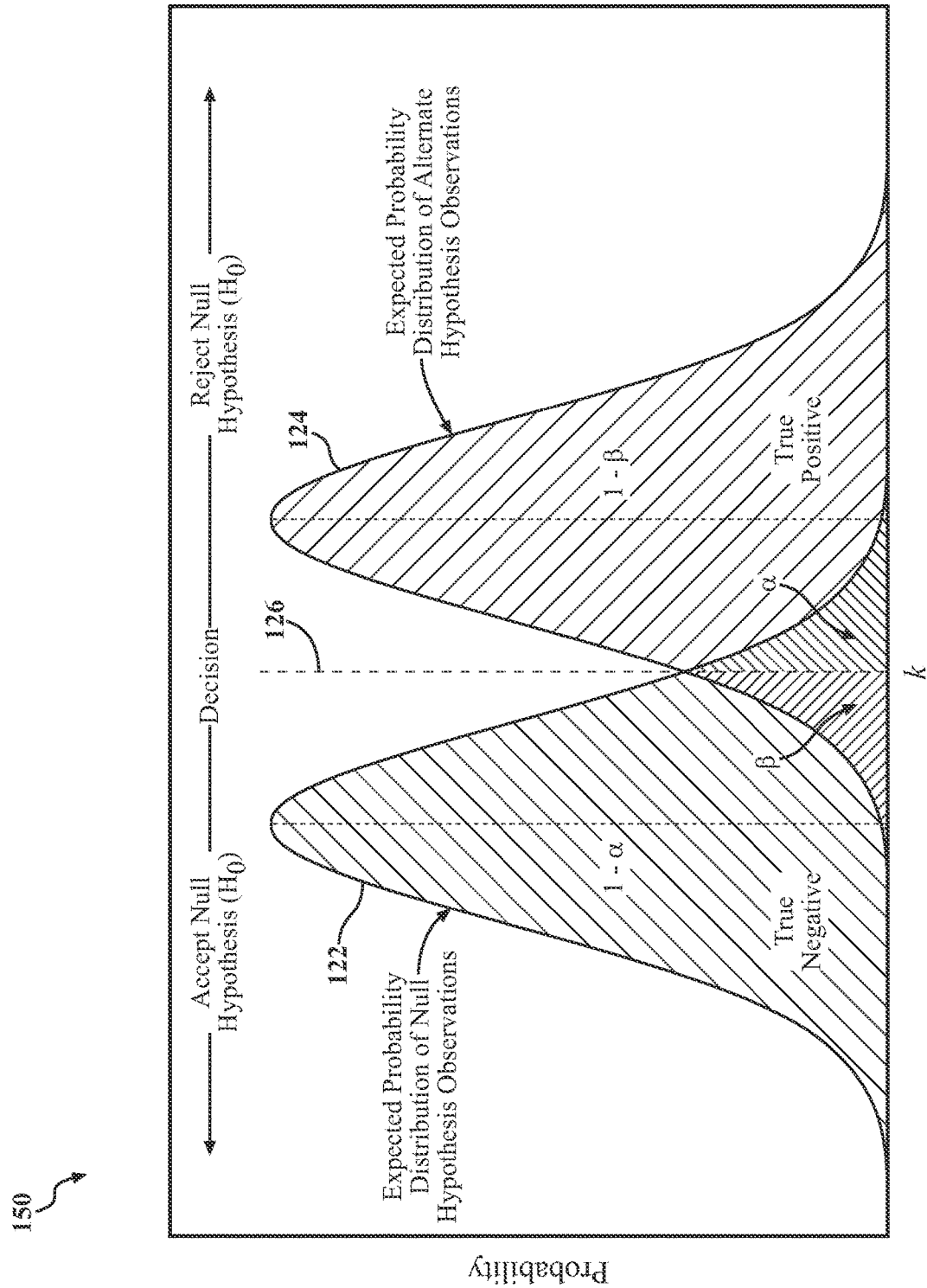
FIG. 1B is an example graph illustrating statistical power of a hypothesis test.

For example, as illustrated in FIG. 1B (e.g., an example 150 illustrating how statistical power fits into hypothesis testing), the likelihood ratio test threshold, k, may be determined as a value of vertical dashed line 126. Dashed line 126 represents the point where distribution curves 122, 124 overlap and thus, is the deciding value between accepting the null hypothesis and rejecting the null hypothesis. In this example, distribution curve 122 represents an expected probability density distribution where the null hypothesis is true, and distribution curve 124 represents an expected probability density distribution where the null hypothesis is false (e.g., alternate hypothesis is true). In embodiments described herein, distribution curves 122 and 124 may be generated using kernel density estimation. Decreasing the value of k (e.g., moving dashed line 126 to the left) increases the power ($1-\beta$) of the hypothesis test while also increasing the probability of type I errors ($\alpha$). Increasing the value of k (e.g., moving dashed line 106 to the right) decreases the power ($1-\beta$) of the hypothesis test while also decreasing the probability of type I errors ($\alpha$). In various embodiments described herein, the goal is to maximize the power of the test while keeping the probability of a type I error below a desired type I error value ($\alpha$). Thus, in certain embodiments, a likelihood ratio test may be trained to detect data errors. Training the likelihood ratio test may involve determining an optimal value of k such that the power of the test is maximized subject to the desired type I error probability ($\alpha$).

Example Method for Training a Likelihood Ratio Test to Detect Data Errors

Figure 2A:
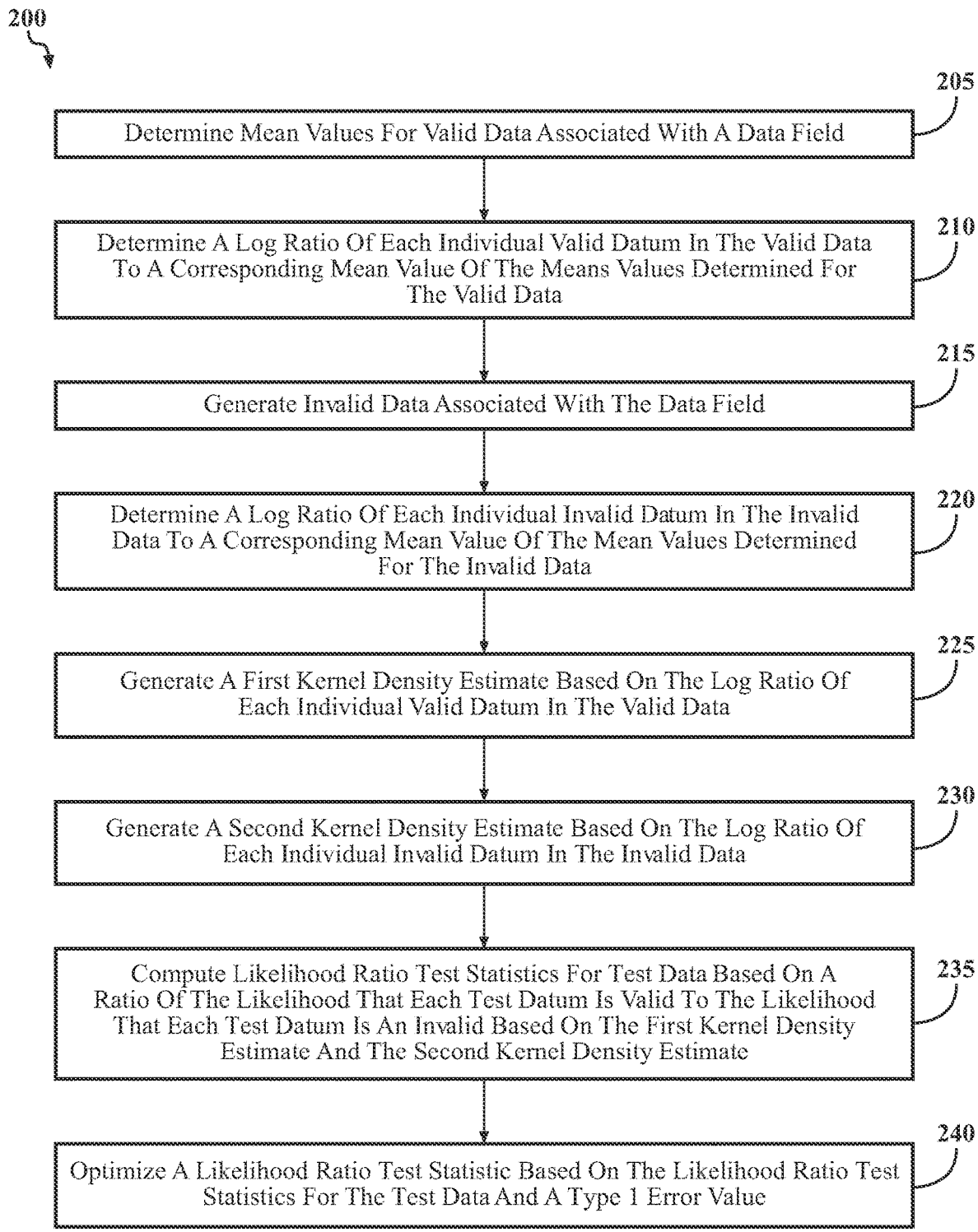
FIG. 2A illustrates an example method for training a likelihood ratio test to detect data errors.

FIG. 2A illustrates an example method 200 for training a likelihood ratio test to detect errors in numerical data. Method 200 may be performed by one or more processor(s) of a computing device, such as processor(s) 402 of computing device 400 described below with respect FIG. 4.

Figure 2B:
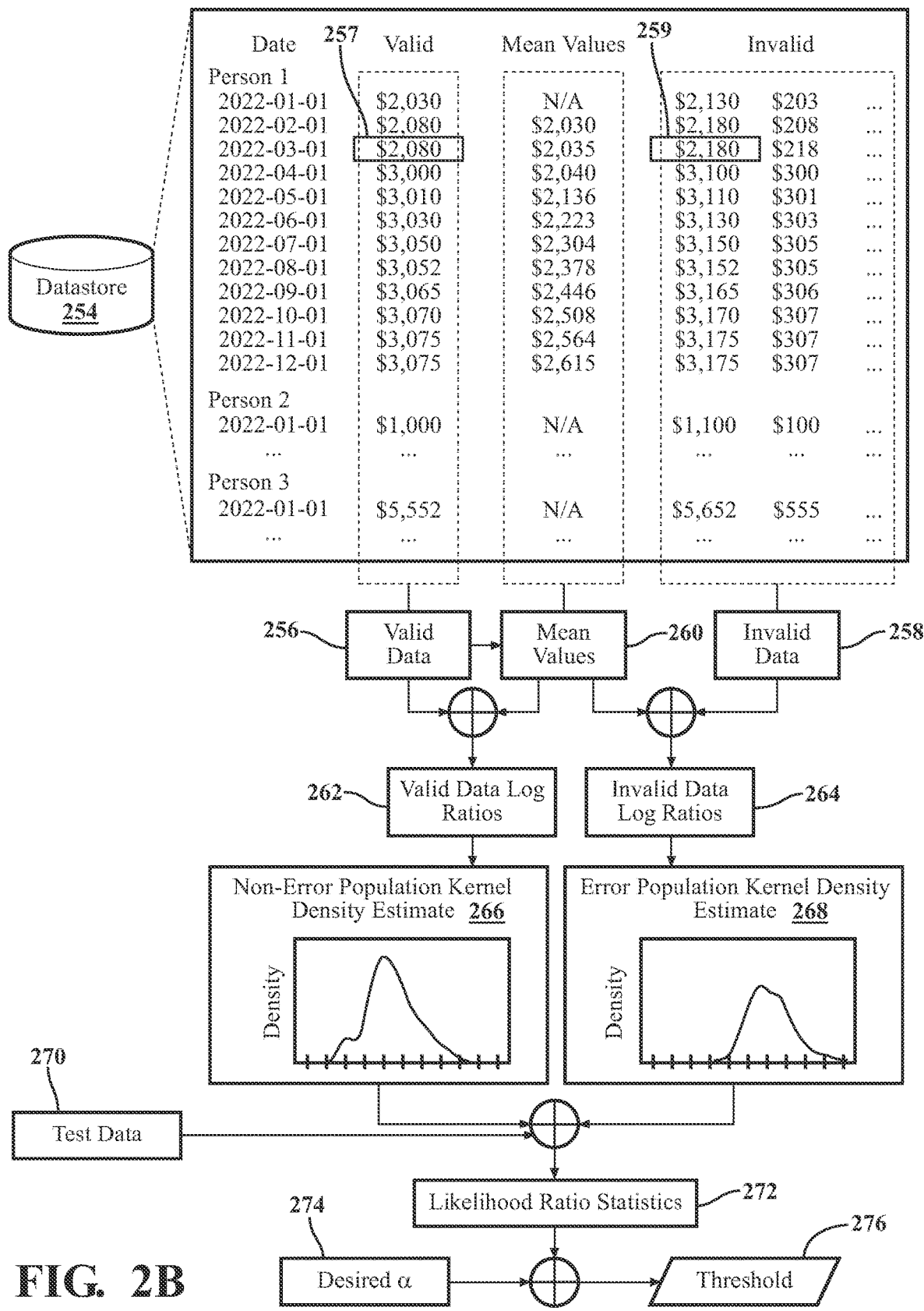
FIG. 2B illustrates an example workflow for training a likelihood ratio test to detect data errors.

As described above, training a likelihood ratio test to detect errors in numerical data involves determining an optimal likelihood ratio test threshold, k, that can be used for classifying numerical values (e.g., associated with a data field) as valid or invalid. In some embodiments described herein, the determined likelihood ratio test threshold, k, is a value that maximizes a power ($1-\beta$) of the likelihood ratio test subject to a desired type I error probability ($\alpha$). FIG. 2B is a workflow illustrating steps of method 200 in detail, including relationships between various steps and the possibility for parallelizing the processing of various steps. FIGS. 2A and 2B are described in conjunction below.

Method 200 begins, at step 205 by determining mean values for valid data associated with a data field. The valid data may include valid values previously entered for the data field. The mean values for the valid data may be determined via a simple moving average technique, a weighted moving average technique, an exponential weighting/moving average technique, an exponential smoothing technique, and/or the like. The main difference between the simple moving average technique, the weighted moving average, the exponential weighting/moving average technique, and the exponential smoothing technique is the sensitivity that each technique shows to changes in the data used to calculate the average. For example, a simple moving average technique calculates the mean value over a specific period of time, while a weighted moving average gives more weight to current data (e.g., more recently entered valid data).

As illustrated in the example of FIG. 2B, the valid data 256 may include values representing amounts paid to different employees for previous months (e.g., pay for person 1, person 2, and person 3 for months January through December 2022) stored in datastore 254. These values represent values previously input, by a user, as data entries into an application. Mean values 260 are calculated for each valid data point in valid data 256 using an exponential smoothing technique. Each exponential smoothing mean value is calculated as:

Exponential Smoothing Mean Value=($\alpha$*Previous month value)+[(1–$\alpha$)*Previous Month's Exponential Smoothing Mean Value]

where $\alpha$ represents the smoothing parameter that defines the weighting (e.g., variable $\alpha$ used in the exponential smoothing mean value equation is different than variable $\alpha$ representing the desired type I error value, used herein). Variable $\alpha$ may be a value greater than zero and less than one. For this example, variable $\alpha$ is selected to be equal to 0.1. As such, the exponential smoothing mean value calculated, for example, for valid data value 257 ($2,080) corresponding to March 2022 is equal to Exponential Smoothing Mean Value for March 2022 =(0.1*2,080)+[(1–0.1)*2,030)=2,035 where "2,080" represents the value associated with February 2022 for person 1 and "2,030" represents the exponential smoothing mean value associated with February 2022. This formula is similarly used to calculate the exponential smoothing mean value for each valid datum between January 2022 through December 2022 for person 1, person 2, and person 3. Because inputs of the exponential smoothing mean value equation include values associated with previous months, no exponential smoothing mean value is calculated for January 2022 for each of person 1, person 2, or person 3 (given data for a previous month does not exist).

Although the valid data in the example of FIG. 2B represents amounts paid to three different employees for previous months, in certain embodiments, other types, values, and/or amounts of data are considered when calculating mean values at step 205. Further, although the technique used in the example of FIG. 2B to calculate mean values 260 is exponential smoothing with an a equal to 0.1, in certain embodiments, other techniques and/or other a values may be considered when calculating mean values 260 for the valid data.

Method 200 proceeds, at step 210, with determining a log ratio of each individual valid datum in the valid data to a corresponding mean value of the means values determined for the valid data. The log ratio is calculated as $$\text{Log Ratio} = \log\left(\frac{\text{Valid Datum Value}}{\text{Mean Value Corresponding to the Valid Datum Value}}\right)$$

In FIG. 2B, valid data log ratios 262 are calculated using the above equation. For example, a log ratio calculated for valid data value 257 ($2,080) corresponding to March 2022 is equal to $$\text{Log Ratio} = \log\left(\frac{2,080}{2,035}\right) = 0.094989$$

This formula is similarly used to calculate the log ratio for each valid datum (e.g., between January 2022 through December 2022 for person 1, person 2, and person 3) in valid data 256.

Method 200 proceeds, at step 215, with generating invalid data associated with the data field. In some examples, such as this one, invalid data is artificially generated rather than produced by real-world events (e.g., data entries made by users). The invalid data may be generated to represent various typographical and/or logical errors that are known to occur for each valid data value in valid data 256. However, in other examples, invalid data may include (or exclusively be) data collected from real world data entries. In some cases, a small amount of real world data may be supplemented with artificially generated data to improve the data set available for training.

For example, in FIG. 2B, for valid data value 257 ($2,080), various invalid values (e.g., collectively referred to as invalid data 258) may be generated based on the valid value, such as "2,180" to represent cases where a user inadvertently entered a wrong number for one of the numbers of the value (e.g., entered "1" instead of "0") or "208" to represent cases where a user fails to enter all numbers of the value. Other invalid values that may be generated but are not shown in FIG. 2B, include invalid values such as "2,800" and "2,008" to represent cases where a user inadvertently entered the numbers of the value in the wrong order, or "20,800" and "2,880" to represent cases where a user inadvertently entered one or more characters of the value more than once (e.g., duplication errors), or "100" and "2,100" to represent cases where a user inadvertently entered a value intended for a different data field (e.g., logical errors), and others. Similar techniques may be used to generate invalid values for each of the other valid data values in valid data 256.

Method 200 then proceeds, at step 220, with determining an invalid data log ratio 264 for each individual invalid datum in the invalid data to a corresponding mean value of the mean values determined for the valid data. The log ratio is calculated as $$\text{Log Ratio} = \log\left(\frac{\text{Invalid Datum Value}}{\text{Valid Mean Value Corresponding to the Invalid Datum Value}}\right)$$

In FIG. 2B, invalid data log ratios 264 are calculated using the above equation. For example, a log ratio calculated for invalid data value 259 ($2,180) corresponding to March 2022 is equal to $$\text{Log Ratio} = \log\left(\frac{2,180}{2,035}\right) = 0.029892$$

This formula is similarly used to calculate the log ratio for each invalid datum (e.g., between January 2022 through December 2022 for person 1, person 2, and person 3) in invalid data 258.

Method then proceeds, at step 225, with generating a first kernel density estimate based on the log ratio of each individual valid datum in the valid data. Generating the first kernel density estimate involves applying a kernel function to the log ratio of each individual valid datum in the valid data (e.g., valid data log ratios 262 in FIG. 2B) to estimate the kernel density. In certain embodiments, the kernel function is a Gaussian kernel. For a data point y, the kernel density estimate, with a Gaussian kernel, is computed as $$\rho_K(y) = \sum_{i=1}^{N} K(y - x_i; h)$$

where, $$K(x; h) \propto \exp\left(-\frac{x^2}{2h^2}\right),$$

h is the bandwidth parameter, and xi includes valid data log ratios 262 calculated for person 1, person 2, and person 3. In certain embodiments, bandwidth parameter, h, is calculated using Silverman's (1986) optimum estimate of h calculated as:

$$h_{Silverman} = 0.9sn^{-\left(\frac{1}{5}\right)}$$

where n is the number of valid datum points in valid data 256 for each person, and s is the standard deviation of the valid datum point in valid data 256 for each person. For example, in FIG. 2B, $h_{Silverman}$ may be calculated as:

$$h_{Silverman} = 0.9(426.9)(12)^{-\left(\frac{1}{5}\right)}$$

given 12 valid data points exist for person 1 in valid data 256 (e.g., from January 2022 through December 2022), the standard deviation of these twelve data points is equal to 426.9.

In certain other embodiments, bandwidth parameter, h, is calculated using a normal distribution function for determining an optimal value of h calculated as:

$$h_{norm} = s\left(\frac{4}{3n}\right)^{\frac{1}{5}} \approx 1.059224sn^{\frac{1}{5}}$$

where n is the number of valid datum points in valid data 256 for each person, and s is the standard deviation of the valid datum point in valid data 256 for each person.

Different data points y may be any value which satisfies the below rule (Minimum Valid Data Log Ratio 262)≤y≤(maximum Valid Data Log Ratio 262).

In some cases, y values {$y_1, y_2, y_3, \ldots y_x, \ldots y_z$} are equal to the following values, respectively:

$y_1$ = min. log ratio 262

$y_2$ = (min. log ratio 262) + $\left(\frac{(\text{max. log ratio 262}) - (\text{min. log ratio 262})}{\text{number of expected data points}}\right)$ $y_3$ = (min. log ratio 262) +

-continued $\left[2 * \left(\frac{(\text{max. log ratio 262}) - (\text{min. log ratio 262})}{\text{number of data points}}\right)\right]$ $y_x$ = (min. log ratio 262) +

$\left[(x-1) * \left(\frac{(\text{max. log ratio 262}) - (\text{min. log ratio 262})}{\text{number of expected data points}}\right)\right]$

...

$y_z$ = max. log ratio 262

In FIG. 2B, generating a first kernel density estimate based on valid data log ratios 262 results in generating non-error population kernel density estimation 266. It is noted that kernel density estimate 266 in FIG. 2B is provided for illustration, and the shape of kernel density estimate 266 does not accurately reflect a kernel density estimate calculated for valid data log ratios 262.

Method 200 then proceeds, at step 230, with generating a second kernel density estimate based on the log ratio of each individual invalid datum in the invalid data. Generating the second kernel density estimate involves applying the same kernel function to the log ratio of each individual valid datum in the valid data (e.g., invalid data log ratios 264 in FIG. 2B) to estimate the kernel density.

In FIG. 2B, generating a second kernel density estimate based on invalid data log ratios 264 results in generating error population kernel density estimate 268. It is noted that error population kernel density estimate 268 in FIG. 2B is provided for illustration, and the shape of error population kernel density estimate 268 does not accurately reflect a kernel density estimate calculated for invalid data log ratios 264.

Method 200 proceeds, at step 235, with computing likelihood ratio test statistics (e.g., $$\frac{L(\theta_0)}{L(\theta_\alpha)})$$

for test data 270 based on a ratio of the likelihood that each test datum is valid to the likelihood that each test datum is invalid based on the first kernel density estimate and the second kernel density estimate. As described above, the likelihood that each test datum is valid is determined using non-error population kernel density estimate 266, the likelihood that each test datum is invalid is determined using error population kernel density estimate 268. Multiple likelihood ratio statistics may be calculated, at step 235, where multiple test data values exist.

The test data values may include log ratios calculated for both valid and invalid data associated with the data field. In certain embodiments, the test data includes valid data log ratios 262 and invalid data log ratios 264.

Subsequent to computing the likelihood ratio statistics, method 200 proceeds, at step 240, with optimizing a likelihood ratio test statistic based on the likelihood ratio test statistics for the test data and a type 1 error value (e.g., a desired type I error probability ($\alpha$)). Optimizing the likelihood ratio test statistic involves determining a value of a likelihood ratio test threshold 276, k, such that a power (1−$\beta$) of the likelihood ratio test is maximized while also keeping the probability of a type I error below or equal to the desired type I error probability ($\alpha$).

For example, in FIG. 2B, to maximize the power (1−β) of the test, an amount of type II errors (β) (e.g., errors resulting due to a failure to reject the null hypothesis when it is, in fact, false) needs to be minimized. In other words, optimizing the likelihood ratio test statistic involves selecting a likelihood ratio test threshold 276, k, that results in almost all, if not all, likelihood ratio test statistics calculated for invalid test data being less than k (e.g., $$\frac{L(\theta_0)}{L(\theta_\alpha)} < k)$$

to reduce the amount of type II errors (β). However, selection of the likelihood ratio test threshold 276, k, may also need to be selected subject to a desired type I error probability (α) (e.g., selected such that a probability of errors resulting due to rejecting the null hypothesis when it is, in fact, true is less than or equal to desired α 274). Thus, optimizing the likelihood ratio test statistic further involves selecting the likelihood ratio test threshold 276, k, that also results in a ratio of an amount of likelihood ratio test statistics calculated for valid test data less than k (e.g., $$\frac{L(\theta_0)}{L(\theta_\alpha)} < k)$$

to an amount of likelihood ratio test statistics calculated for valid test data greater than or equal to k (e.g., $$\frac{L(\theta_0)}{L(\theta_\alpha)} \geq k)$$

less than or equal to desired α 274.

In certain embodiments, optimizing the likelihood ratio test statistic involves selecting, as a first step, any arbitrary value of k, to determine the power (1−β) of the likelihood ratio test, for the selected value of k, using the sample test data. In subsequent iterations, the value of k may be increased or decreased to calculate the power (1−β) of the likelihood ratio test, for the other values of k (e.g., a kind of brute force search method for k). The likelihood ratio test threshold 276, k, may be selected as the value which maximizes the power of the likelihood ratio test (e.g., subject to desired α 274). In certain embodiments, optimizing the likelihood ratio test statistic involves the use of a heuristic and/or algorithm for selecting k to determine the power of the test for each iteration.

In certain embodiments, optimizing the likelihood ratio test statistic involves modifying the value of k and computing a false positive rate (FPR), or α, until a value of k is determined that returns the desired FPR, or desired α 274. While it is true that the value of k impacts both FPR and power, in this approach the value of k is optimized against the FPR only (not the power of the test). Beneficially, the Neyman Pearson Lemma guarantees that, identifying a value of k which translates to a certain desired FPR, will result in a maximum power for that FPR that is possible among all statistical tests.

As described in detail below, the determined likelihood ratio test threshold 276, k, may be subsequently used to classify numerical values, associated with a data field (e.g., new data entered into the data field), as valid or invalid.

A likelihood ratio test threshold 276, k, calculated for one data field may be different than a likelihood ratio test threshold 276, k, calculated for another data field. In other words, method 200 may be performed for each data field for which data may be entered to evaluate whether data entered into the data field is valid or invalid.

Example Method for Detecting Data Errors Using a Likelihood Ratio Test

Figure 3A:
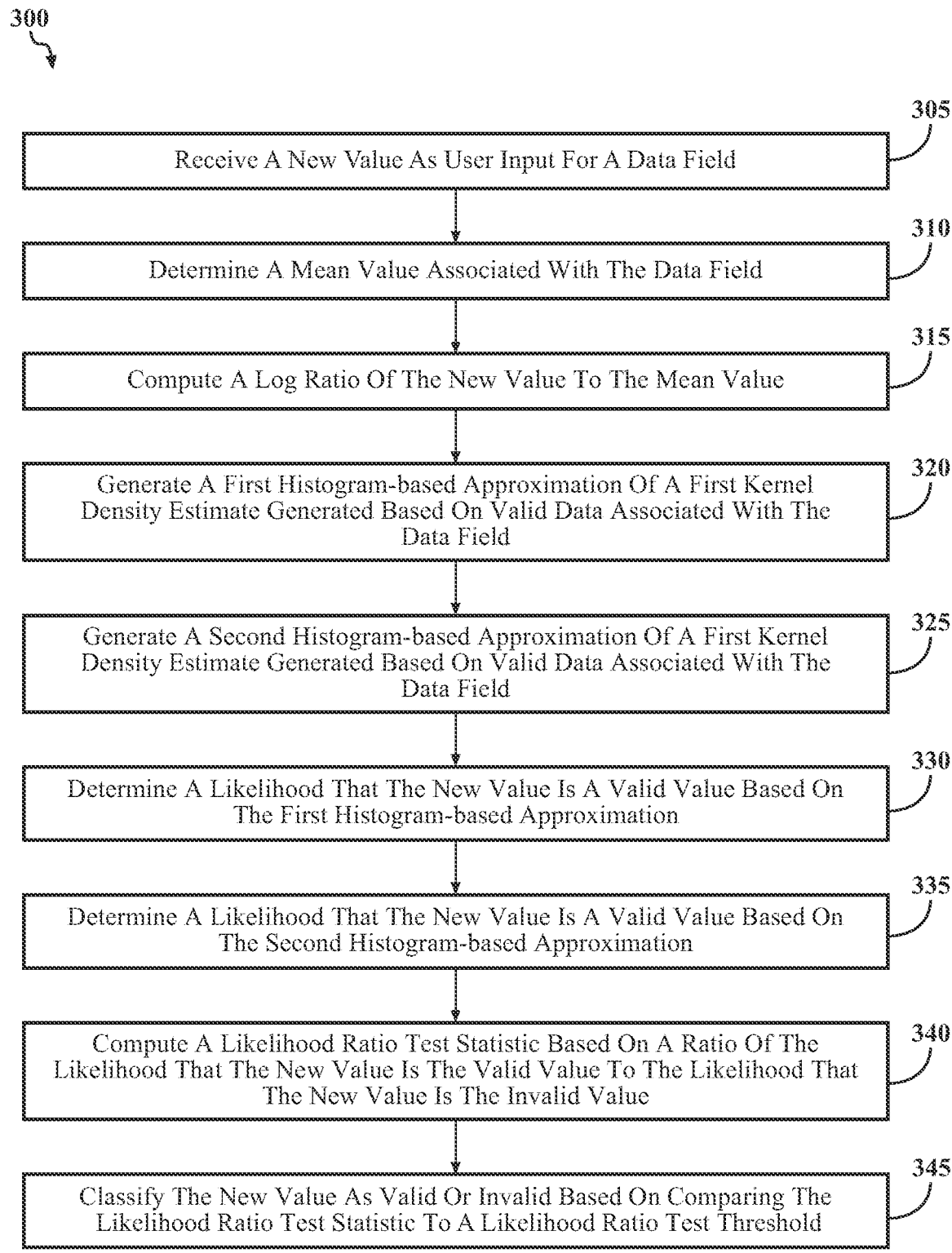
FIG. 3A illustrates an example method for detecting errors in numeric data using a likelihood ratio test.
Figure 3B:
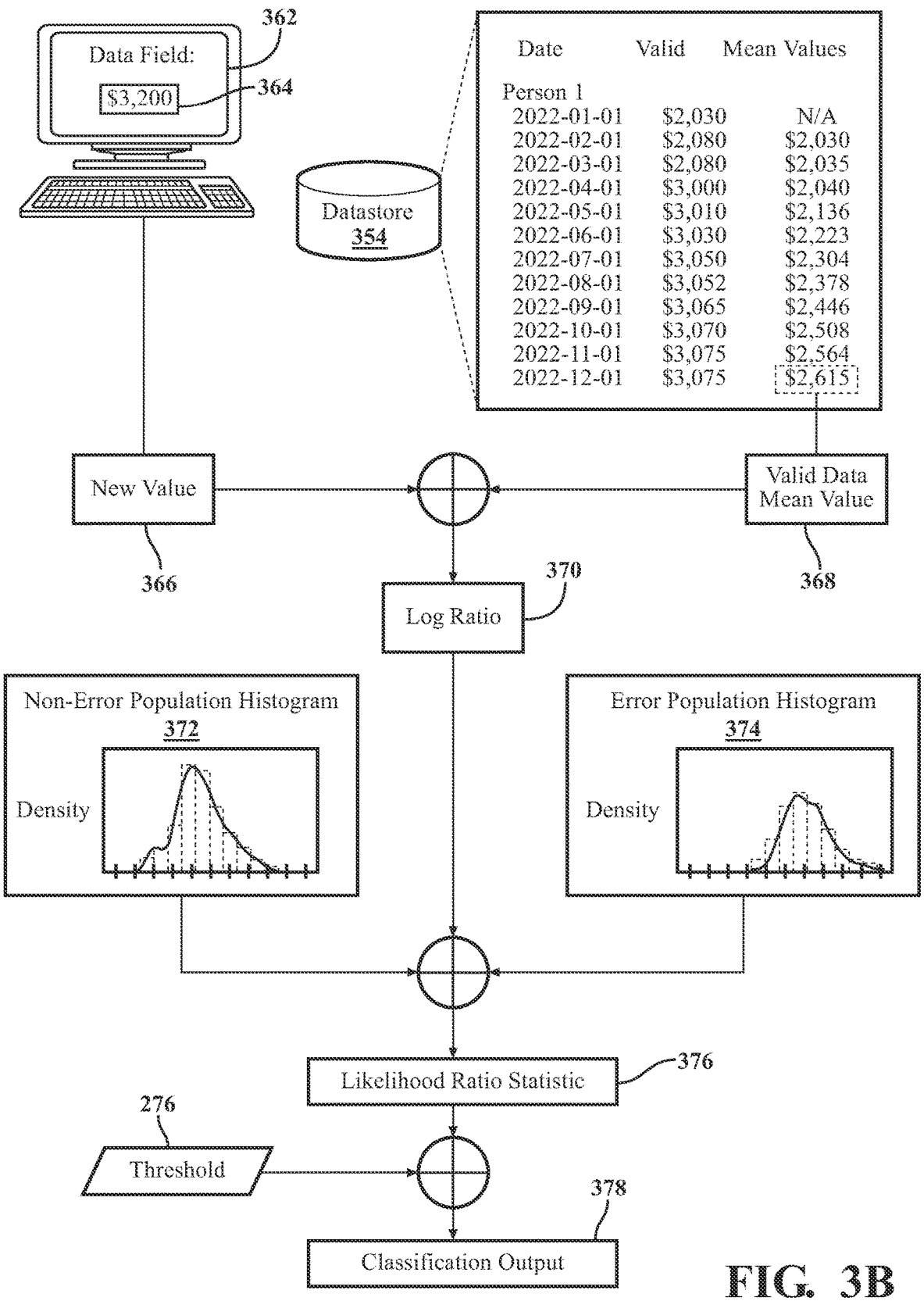
FIG. 3B illustrates an example workflow for detecting errors in numeric data using a likelihood ratio test.

FIG. 3A illustrates an example method 300 for detecting errors in numeric data. Method 300 may be performed by one or more processor(s) of a computing device, such as processor(s) 402 of computing device 400 described below with respect FIG. 4. Method 300 utilizes a likelihood ratio test in conjunction with a modified kernel density estimation for detecting errors in numeric data. FIG. 3B is a workflow illustrating steps of method 300 in detail, including relationships between various steps and the possibility for parallelizing the processing of various steps. FIGS. 3A and 3B are described in conjunction below.

Method 300 begins, at step 305, with receiving a new value as user input for a data field. In certain embodiments, the new value is received via a graphical user interface (e.g., user interface 362 in FIG. 3B and user interface(s) 404 in FIG. 4, described in detail below). For example, as illustrated in FIG. 3B, let the new value 366 be "$3,200" entered into data field 364, via graphical user interface 362. New value 366 of "$3,200" represents an amount to be paid to person 1 for the month of January 2023.

Method 300 proceeds, at step 310, with determining a mean value associated with the data field. In certain embodiments, determining the mean value associated with the data field includes obtaining one of the mean values determined for valid data (also referred to herein as "valid data mean value 368") associated with the data field. The obtained mean value may be a mean value calculated for valid data associated with the data field (e.g., via a simple moving average technique, a weighted moving average technique, an exponential weighting/moving average technique, an exponential smoothing technique, and/or the like) when training a likelihood ratio test to detect errors in numerical data for the data field, according to method 200. The mean value may be obtained from datastore 354. In FIG. 3B, valid data mean value 368 obtained from datastore 354 is the mean value calculated for December 2022 and is equal to $2,615.

Method 300 proceeds, at step 315, with computing a log ratio (e.g., 370 in FIG. 3B) of the new value (e.g., 366 in FIG. 3B) to the mean value (e.g., 366 in FIG. 3B). In the example illustrated in FIG. 3B, log ratio 370 is calculated as Log Ratio 370 =

$$\log\left(\frac{\text{New Value 366}}{\text{Valid Data Mean Value 368}}\right) = \log\left(\frac{3{,}200}{2{,}615}\right) = 0.087678$$

Method 300 then proceeds, at step 320 and step 325, with generating a first histogram-based approximation of a first kernel density estimate generated based on valid data associated with the data field and generating a second histogram-based approximation of a second kernel density estimate generated based on invalid data associated with the data field, respectively. In particular, the first histogram-based approximation may be generated for a non-error population kernel density estimate generated when training a likelihood ratio test to detect errors in numerical data for the data field, such as non-error population kernel density estimate 266 in FIG. 2B. Similarly, the second histogram-based approximation may be generated for an error population kernel density estimate generated when training the likelihood ratio test to detect errors in numerical data for the data field, such as error population kernel density estimate 268 in FIG. 2B.

As described above, a histogram-based approximation is a chart that plots the probability density distribution of numeric values as a series of bars. In other words, a histogram is an alternative to a density curve, or kernel density estimate (e.g., which gives each data point a continuous contribution to a distribution). Each bar typically covers a range of numeric values called a bin or class; a bar's height indicates the frequency of data points with a value within the corresponding bin. Using histogram-based approximations of kernel density estimates, as opposed to the kernel density estimates themselves, for determining the likelihood that the numerical value is valid or invalid helps to save significant compute resources by not having to continuously re-calculate the kernel density estimates, which would require a large amount of expensive compute operations, such as multiplications.

In certain embodiments, bin sizes of the bins created for each histogram-based approximation are consistent. In certain other embodiments, bin sizes of the bins created for each histogram-based approximation are variable. A smaller bin size may be created where a large amount of locally grouped data points exist in the distribution. For example, smaller bin sizes may be created for areas of the kernel density estimate that have higher values on the distribution curve (e.g., indicating more data points exist at these points in the distribution). Using variable bin sizes allows for a smaller number of bins, while continuing to capture fine/additional detail in dense portions of the kernel density estimations. For example, bigger bin ranges may be used to capture data in less dense portions of the kernel density estimate (e.g., where there are fewer data points, for example, at the ends of the distribution curve) without losing much information, while smaller bin ranges may be used capture more dense portions of the kernel density estimate (e.g., around the peaks of the distribution curve) such that there are more bins to capture local variances.

In FIG. 3B, at step 320, non-error population histogram 372 is generated using non-error population kernel density estimate 266 in FIG. 2B. Further, at step 325, error population histogram 374 is generated using error population kernel density estimate 268 in FIG. 2B

Method 300 then proceeds, at step 330, with determining a likelihood that the new value (e.g., 366 in FIG. 3B) is a valid value based on the first histogram-based approximation. For example, step 330 includes determining which bin (e.g., bin range) in non-error population histogram 372, log ratio 370 falls within (e.g., minimum value of bin x≤log ratio 370≤maximum value of bin x). The likelihood that new value 366 is a valid value is equal to the probability density of the determined bin in non-error population histogram 372.

Additionally, at step 335, method 300 includes determining a likelihood that the new value (e.g., 366 in FIG. 3B) is an invalid value based on the second histogram-based approximation. For example, step 335 includes determining which bin (e.g., bin range) in error population histogram 374, log ratio 370 falls within (e.g., minimum value of bin y≤log ratio 370 ≤maximum value of bin y). The likelihood that new value 366 is an invalid value is equal to the probability density of the determined bin in error population histogram 374.

Method 300 then proceeds, at step 340, with computing a likelihood ratio test statistic based on a ratio of the likelihood that the new value is the valid value to the likelihood that the new value is the invalid value. In FIG. 3B, likelihood ratio statistic 376 (e.g., $$\frac{L(\theta_0)}{L(\theta_\alpha)})$$

is computed as a ratio of the probability density of the determined bin in non-error population histogram 372 (e.g., determined at step 330) to the probability density of the determined bin in error population histogram 374 (e.g., determined at step 335).

Method 300 proceeds, at step 345, with classifying the new value as valid or invalid based on comparing the likelihood ratio test statistic to a likelihood ratio test threshold. In FIG. 3B, likelihood ratio statistic 376 (e.g., $$\frac{L(\theta_0)}{L(\theta_\alpha)})$$

is compared to threshold 276 to determine whether likelihood ratio statistic 376 is greater than or equal to threshold 276

$$\left(\frac{L(\theta_0)}{L(\theta_\alpha)} \geq k\right)$$

or greater than or equal to threshold 276

$$\left(\frac{L(\theta_0)}{L(\theta_\alpha)} < k\right)$$

for purposes of classifying new value 366 as valid or invalid. Classification output 378 indicates that new value 366, for data field 362, is valid when likelihood ratio statistic 376 is greater than or equal to threshold 276

$$\left(\frac{L(\theta_0)}{L(\theta_\alpha)} \geq k\right).$$

Further, classification output 378 indicates that new value 366, for data field 362, is invalid when likelihood ratio statistic 376 is less than threshold 276

$$\left(\frac{L(\theta_0)}{L(\theta_\alpha)} < k\right).$$

In certain embodiments, one or more actions may be taken where classification output 378 indicates that new value 366 is invalid. For example, in certain embodiments, actions taken may include providing classification output 378 for new value 366 (e.g., indicating that this input is invalid) to a user that input new value 366. Informing the user may prompt the user to fix the invalid value by re-entering a valid value for data field 364. In certain embodiments, actions taken include correcting new value 366. Correction of new value 366 may be based, at least in part, on the valid data associated with data field 364 (e.g., 256 in FIG. 2B). For example, where it is determined that new value 366 is incorrect due to the user inadvertently striking two keys at the same time with one finger when entering new value 366 in data field 364, new value 366 may be corrected to remove the additional character which was not intended to be entered by the user.

Method 300 may be thus performed to detect errors in numerical data. Beneficially, detecting an error in numeric data at the input stage allows for efficient correction and the avoidance of further processing based on the faulty input data. Accordingly method 300 has the beneficial technical effects of saving compute cycles that would otherwise be expended on faulty numeric data, decreasing overall processing time by avoiding propagation of faulty numeric data, improved user experience by providing the user with meaningful information at the point of data entry, and more generally, the avoidance of various bad outcomes as described above.

For example, method 300 has beneficial technical effects in decision making. In particular, inaccurate data leads to poor decisions. A decision may be no better than the information upon which it's based, and critical decisions based on poor-quality, inaccurate data may have very serious consequences, especially in high-risk industries, as described above. Thus, by checking the validity of data used in decision making, more wise, accurate, and/or informed decisions may be made.

As another example, method 300 has beneficial technical effects with respect to finances. In particular, lost revenue can be a direct or indirect consequence of inaccurate data. For example, inaccurate client information (e.g., contact numbers) may lead to losing out on new opportunities and/or losing existing customers, incorrect personal information (e.g., addresses) may lead to inadvertently shipping products to a wrong customer, inaccurate product information (e.g., speed, or other numerical values about a product) may result in claims or complaints from customers that may cost a business additional capital to fix, and/or the like. Further, data entry errors during the creation of invoices, running payroll, and/or the like may have significant consequences, and the effort required to undo such consequences may be sufficiently great. In particular, it may cost ten times as much to complete a unit of work when the data is flawed, in any way, as it does when it is correct. Method 300, used for validating data, may help to avoid one or more of these scenarios.

Figure 4:
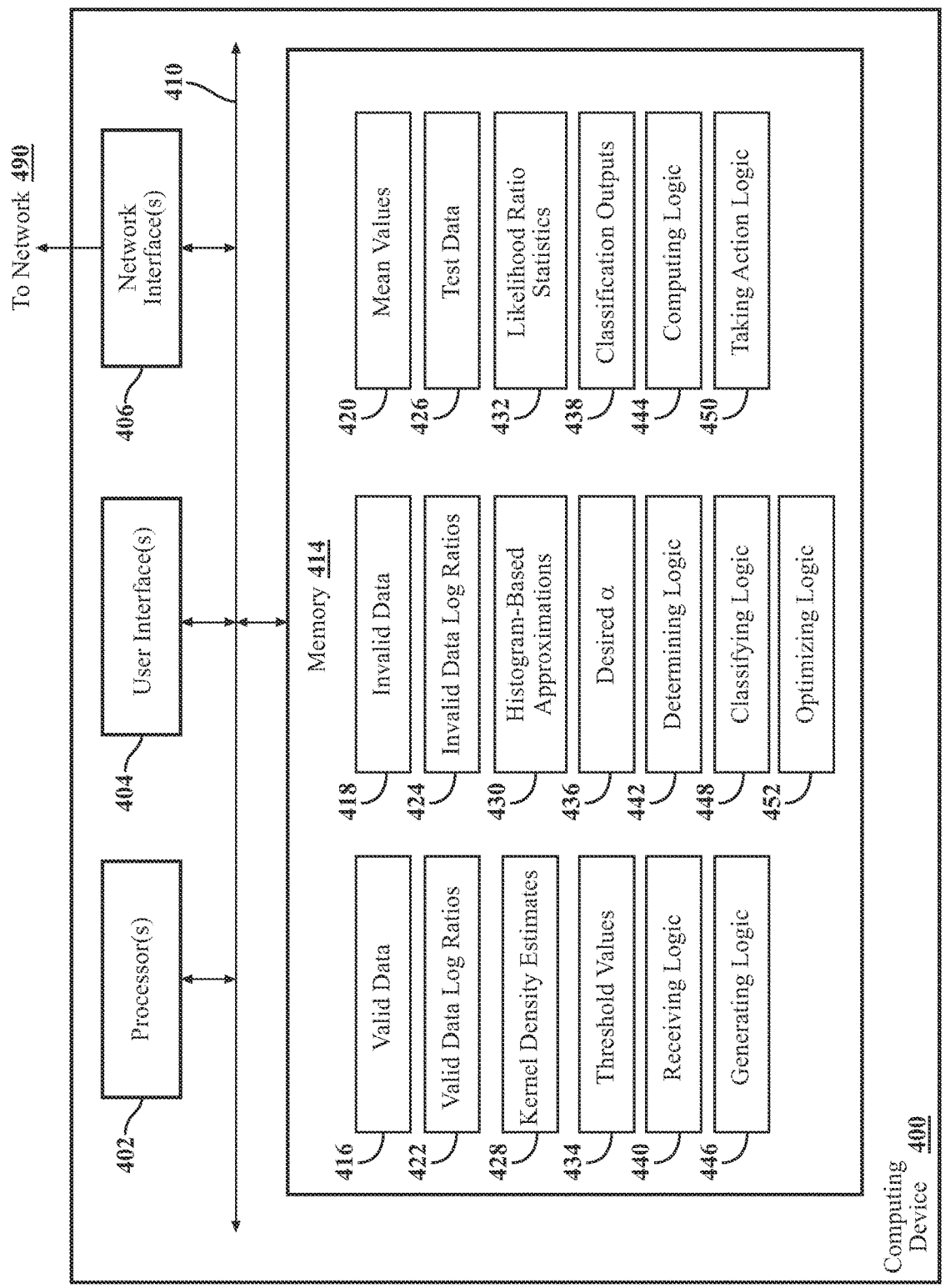
FIG. 4 illustrates an example system on which aspects of the present disclosure can be performed.

Example Computing Device for Detecting Data Entry Errors Using Machine Learning Models FIG. 4 depicts a block diagram of an example computing device 400 that implements various features and processes, based on the methods described herein. For example, computing device 400 may be configured to perform method 200 and/or method 300 illustrated in FIGS. 2A, 2B, 3A, and 3B, respectively.

Computing device 400 is implemented on any electronic device that runs software applications derived from complied instructions, including without limitation, personal computers, servers, smart phones, media players, electronic tablets, game consoles, email devices, etc. In certain embodiments, computing device 400 includes one or more processors 402, one or more user interfaces 404, one or more network interfaces 406 through which computing device 400 is connected to network 490 (which may be a local network, an intranet, the internet, or any other group of computing devices communicatively connected to each other), and memory 414.

Each of these components may be coupled by a bus 410. Bus 410 includes any internal or external bus technology, including but not limited to, ISA, EISA, PCI, PCI Express, USB, Serial ATA or FireWire.

Processor(s) 402 may retrieve and execute programming instructions stored in the memory 414. Similarly, processor(s) 402 may retrieve and store application data residing in the memory 4014 Bus 410 transmits programming instructions and application data, among the processor(s) 402, network interface(s) 406, and memory 414. In certain embodiments, processor(s) 402 is included to be representative of a single CPU/GPU/TPU/machine learning accelerator, multiple CPUs/GPUs/TPUs/machine learning accelerators, a single CPU/GPU/TPU/machine learning accelerator having multiple processing cores, and/or the like.

User interface(s) 404 may include any device, mechanism, system, interactive display, and/or various other hardware components for communicating information between computing device 400 and a user of computing device 400. For example, user interface(s) 404 may include input hardware, such as a keyboard, touch screen, button, microphone, and/or other device for receiving inputs from the user. User interface(s) 404 may further include display hardware, such as, for example, a monitor, a video card, and/or other another device for sending and/or presenting visual data to the user. In certain embodiments, user interface(s) 404 is a graphical user interface.

Network interface(s) 406 provides computing device 400 with access to external networks, such as network 490, and thereby external processing systems and/or computing devices. Network interface(s) 406 can be any device capable of transmitting and/or receiving data via network 490. Accordingly, network interface(s) 406 can include a communication transceiver for sending and/or receiving any wired and/or wireless communication. For example, Network interface(s) 406 may include an antenna, a modem, LAN port, WiFi card, WiMAX card, mobile communications hardware, near-field communication hardware, satellite communication hardware and/or any wired or wireless hardware for communicating with other networks and/or devices/systems. In certain embodiments, network interface(s) 406 includes hardware configured to operate in accordance with the Bluetooth® wireless communication protocol.

Memory 414 is representative of a volatile memory, such as a random access memory (RAM), or a nonvolatile memory, such as nonvolatile random access memory, phase change random access memory, or the like. As shown, memory 414 includes valid data 416, invalid data 418, mean values 420, valid data log ratios 422, invalid data log ratios 424, test data 426, kernel density estimates 428, histogram-based approximations 430, likelihood ratio statistics 432, threshold values 434, desired a 436, classification outputs 438, receiving logic 440, determining logic 442, computing logic 444, generating logic 446, classifying logic 448, taking action logic 450, and optimizing logic 452.

As described above, valid data 416 includes correct numerical values previously entered for a data field. Further, invalid data 418 includes artificially-generated values with errors for a data field that are known to occur and therefore are predictable, such as the various typographical errors discussed above (e.g., transposition errors, duplication errors, omission errors, substitution errors, and others) as well as logical errors. In certain embodiments, valid data 416 is an example of valid data 256 in FIG. 2B and invalid data 418 is an example of invalid data 258 in FIG. 2B.

As described above, mean values 420 are determined for valid data 416 using a simple moving average technique, a weighted moving average technique, an exponential weighting/moving average technique, an exponential smoothing technique, and/or the like. In certain embodiments, mean values 420 is an example of mean values 260 in FIG. 2B and/or valid data mean value 368 in FIG. 3B.

As described above, valid data log ratios 422 are calculated log ratios of each valid datum in valid data 416 to a corresponding mean value calculated for each valid datum in mean values 420. Further, invalid data log ratios 424 are calculated log ratios of each invalid datum in invalid data 418 to a corresponding mean value in mean values 420. In certain embodiments, valid data log ratios 422 are an example of valid data log ratios 262 in FIG. 2B and/or log ratio 370 in FIG. 3B, while invalid data log ratios 424 are an example of invalid data log ratios 264 in FIG. 2B and/or log ratio 370 in FIG. 3B.

As described above, test data 426 includes both known valid and invalid data for different data fields that is used to optimize likelihood ratio statistics. In certain embodiments, test data 426 is an example of test data 270 in FIG. 2B.

As described above, kernel density estimates 428 illustrate relationships between random variables and their probability. Kernel density estimates 428 may be created via a kernel density estimation. In certain embodiments, kernel density estimates 428 are examples of non-error population kernel density estimate 266 and error population kernel density estimate 268 in FIG. 2B.

As described above, histogram-based approximations 430 are charts that plot kernel density estimates of numeric values as series of bars. Histogram-based approximations 430 may be generated from kernel density estimates 428. In certain embodiments, histogram-based approximations 430 are examples of non-error population histogram 372 and error population histogram 374 in FIG. 3B.

As described above, a likelihood ratio statistic 432 is a value based on a ratio of a likelihood that a numerical value is a valid value to a likelihood that the numerical value is an invalid value. Likelihood ratio statistics 432 may be calculated for valid data log ratios 422, invalid data log ratios 424, log ratios of test data 426, and/or a log ratio of a new value input, for example, in an application. In certain embodiments, likelihood ratio statistic 432 are examples of likelihood ratio statistics 272 in FIG. 2B and/or likelihood ratio statistic 376 in FIG. 3B.

As described above, a threshold value 434 are is a value chosen such that a null hypothesis $H_0$: $\theta=\theta_0$ against a null hypothesis $H_\alpha$: $\theta=\theta_\alpha$, maximizes the power of a test $(1-\beta)$ while keeping a probability of a type I error below or equal to a desired type I error value ($\alpha$). Different threshold values 434 may be calculated for different data fields and/or different data for different people, employers, items, etc. In certain embodiments, threshold values 434 are examples of threshold value 276 in FIG. 2B and FIG. 3B.

As described above, desired $\alpha$ 436 are desired type I error values (e.g., to be used when determining threshold values 434). A probability of a type I error ($\alpha$) is the probability of rejecting the null hypothesis when it is, in fact, true (e.g., the probability of a false-positive error). In certain embodiments, desired $\alpha$ 436 are examples of desired $\alpha$ 274 in FIG. 2B.

As described above, classification outputs 438 provide an indication as to whether a new value for a data field is valid or invalid. In certain embodiments, classification outputs 438 are examples of classification output 378 in FIG. 3B.

In certain embodiments, receiving logic 440 includes logic for receiving a new value as user input for a data field.

In certain embodiments, determining logic 442 includes logic for determining a mean value associated with the data field. In certain embodiments, determining logic 442 includes logic for determining a likelihood that the new value is a valid value based on the first histogram-based approximation. In certain embodiments, determining logic 442 includes logic for determining a likelihood that the new value is an invalid value based on the second histogram-based approximation. In certain embodiments, determining logic 442 includes logic for determining mean values for valid data associated with a data field. In certain embodiments, determining logic 442 includes logic for determining a log ratio of each individual valid datum in the valid data to a corresponding mean value of the means values determined for the valid data. In certain embodiments, determining logic 442 includes logic for determining a log ratio for each individual invalid datum in the invalid data to a corresponding mean value of the mean values determined for the valid data.

In certain embodiments, computing logic 444 includes logic for computing a log ratio of the new value to the mean value. In certain embodiments, computing logic 444 includes logic for computing a likelihood ratio test statistic based on a ratio of the likelihood that the new value is the valid value to the likelihood that the new value is the invalid value. In certain embodiments, computing logic 444 includes logic for computing likelihood ratio test statistics for test data based on a ratio of the likelihood that each test datum is valid to the likelihood that each test datum is an invalid based on the first kernel density estimate and the second kernel density estimate.

In certain embodiments, generating logic 446 includes logic for generating a first histogram-based approximation of a first kernel density estimate generated based on valid data associated with the data field. In certain embodiments, generating logic 446 includes logic for generating a second histogram-based approximation of a second kernel density estimate generated based on invalid data associated with the data field. In certain embodiments, generating logic 446 includes logic for generating invalid data associated with the data field. In certain embodiments, generating logic 446 includes logic for generating a first kernel density estimate based on the log ratio of each individual valid datum in the valid data. In certain embodiments, generating logic 446 includes logic for generating a second kernel density estimate based on the log ratio of each individual invalid datum in the invalid data. In certain embodiments, generating logic 446 includes logic for generating the first kernel density estimate comprises applying a kernel function to the log ratio of each individual valid datum in the valid data to estimate a first kernel density. In certain embodiments, generating logic 446 includes logic for generating the second kernel density estimate comprises applying the kernel function to the log ratio of each individual invalid datum in the invalid data to estimate a second kernel density.

In certain embodiments, classifying logic 448 includes logic for classifying the new value as valid or invalid based on comparing the likelihood ratio test statistic to a likelihood ratio test threshold.

In certain embodiments, taking action logic 450 includes logic for taking one or more actions based on a classification output.

In certain embodiments, optimizing logic 452 includes logic for optimizing a likelihood ratio test statistic based on the likelihood ratio test statistics for the test data and a type 1 error value.

Note that FIG. 4 is just one example of a computing device consistent with aspects described herein, and other computing devices having additional, alternative, or fewer components are possible consistent with this disclosure.

Example Clauses

Implementation details of various aspects of the present disclosure are described in the following numbered clauses.

Clause 1: A method of detecting data errors, comprising: receiving a new value as user input for a data field; generating histogram-based approximations of kernel density estimates generated based on valid data and invalid data associated with the data field; determining a likelihood that the new value is a valid value and a likelihood that the new value is an invalid value based on the histogram-based approximations; computing a likelihood ratio test statistic based on a ratio of the likelihood that the new value is the valid value to the likelihood that the new value is the invalid value; and classifying the new value as valid or invalid based on comparing the likelihood ratio test statistic to a likelihood ratio test threshold.

Clause 2: The method of Clause 1, further comprising, prior to receiving the new value as the user input for the data field: determining mean values for the valid data associated with the data field; determining a log ratio of each individual valid datum in the valid data to a corresponding mean value of the mean values determined for the valid data; generating invalid data associated with the data field; determining a log ratio of each individual invalid datum in the invalid data to a corresponding mean value of the mean values determined for the valid data; generating the kernel density estimates based on applying a kernel function to the log ratio of each individual valid datum in the valid data and to the log ratio of each individual invalid datum in the invalid data.

Clause 3: The method of Clause 2, wherein the mean values for the valid data and the mean values for the invalid data are determined via a simple moving average technique, a weighted moving average technique, an exponential weighting technique, or an exponential smoothing technique.

Clause 4: The method of any one of Clauses 2-3, wherein the kernel function comprises a Gaussian kernel.

Clause 5: The method of any one of Clauses 2-4, further comprising: determining a mean value associated with the data field; and computing a log ratio of the new value to the mean value, wherein the likelihood that the new value is the valid value and the likelihood that the new value is the invalid value is determined using the log ratio of the new value to the mean value.

Clause 6: The method of Clause 5, wherein determining the mean value associated with the data field comprises obtaining one of the mean values determined for the valid data.

Clause 7: The method of any one of Clauses 1-6, wherein the histogram-based approximations comprise variable bin width sizes.

Clause 8: The method of any one of Clauses 1-7, wherein the likelihood ratio test statistic corresponds to a type 1 error value.

Clause 9: The method of any one of Clauses 1-8, wherein the new value, the valid data, and the invalid data are associated with at least one of a same person, a same company, or a same item.

Clause 10: A method of training a likelihood ratio test to detect data errors, comprising: determining mean values for valid data associated with a data field; determining a log ratio of each individual valid datum in the valid data to a corresponding mean value of the mean values determined for the valid data; generating invalid data associated with the data field; determining a log ratio for each individual invalid datum in the invalid data to a corresponding mean value of the mean values determined for the valid data; generating a first kernel density estimate based on the log ratio of each individual valid datum in the valid data; generating a second kernel density estimate based on the log ratio of each individual invalid datum in the invalid data; computing likelihood ratio test statistics for test data based on a ratio of a likelihood that each test datum is valid to a likelihood that each test datum is an invalid based on the first kernel density estimate and the second kernel density estimate; and optimizing a likelihood ratio test statistic based on the likelihood ratio test statistics for the test data and a type 1 error value.

Clause 11: The method of Clause 10, wherein the mean values for the valid data are determined via a simple moving average technique, a weighted moving average technique, an exponential weighting technique, or an exponential smoothing technique.

Clause 12: The method of Clause 11, wherein: generating the first kernel density estimate comprises applying a kernel function to the log ratio of each individual valid datum in the valid data to estimate a first kernel density; and generating the second kernel density estimate comprises applying the kernel function to the log ratio of each individual invalid datum in the invalid data to estimate a second kernel density.

Clause 13: The method of Clause 12, wherein the kernel function comprises a Gaussian kernel.

Clause 14: The method of any one of Clauses 10-13, wherein optimizing the likelihood ratio test statistic based on the likelihood ratio test statistics for the test data and the type 1 error value comprises: determining a likelihood ratio test threshold corresponding to the type 1 error value.

Clause 15: A processing system, comprising: a memory having executable instructions stored thereon; and a processor configured to execute the executable instructions to cause the processing system to perform the operations of any one of Clauses 1 through 14.

Clause 16: A processing system, comprising: means for performing the operations of any one of Clauses 1 through 14.

Clause 17: A computer-readable medium having executable instructions stored thereon which, when executed by a processor, causes the processor to perform the operations of any one of clauses 1 through 14.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of detecting data errors, comprising:
   receiving a new value as user input for a data field;
   generating a first histogram-based approximation of a first kernel density estimate generated based on valid data associated with the data field and a second histogram-based approximation of a second kernel density estimate generated based on invalid data associated with the data field;
   determining a first likelihood that the new value is valid, wherein the first likelihood is equal to a first probability density of a first bin of the first histogram-based approximation that includes a log ratio of the new value to a mean value associated with the data field;
   determining a second likelihood that the new value is invalid, wherein the second likelihood is equal to a second probability density of a second bin of the second histogram-based approximation that includes the log ratio of the new value to the mean value associated with the data field;
   computing a likelihood ratio test statistic based on a ratio of the first likelihood that the new value is valid to the second likelihood that the new value is invalid;
   classifying the new value as valid or invalid based on comparing the likelihood ratio test statistic to a likelihood ratio test threshold; and
   when the new value is classified as invalid, taking one or more actions to correct the new value.

2. The computer-implemented method of claim 1, further comprising,
   prior to receiving the new value as the user input for the data field:
   determining mean values for the valid data associated with the data field;
   determining a log ratio of each individual valid datum in the valid data to a corresponding mean value of the mean values determined for the valid data;
   generating invalid data associated with the data field;
   determining a log ratio of each individual invalid datum in the invalid data to a corresponding mean value of the mean values determined for the valid data; and
   generating the first kernel density estimate based on applying a kernel function to the log ratio of each individual valid datum in the valid data; and
   generating the second kernel density estimate based on applying the kernel function to the log ratio of each individual invalid datum in the invalid data.

3. The computer-implemented method of claim 2, wherein the mean values for the valid data and the mean values for the invalid data are determined via a simple moving average technique, a weighted moving average technique, an exponential weighting technique, or an exponential smoothing technique.

4. The computer-implemented method of claim 2, wherein the kernel function comprises a Gaussian kernel.

5. The computer-implemented method of claim 2, further comprising:
   determining the mean value associated with the data field; and
   computing the log ratio of the new value to the mean value.

6. The computer-implemented method of claim 1, wherein at least one of the first histogram-based approximation or the second histogram-based approximation comprises variable bin width sizes.

7. The computer-implemented method of claim 1, wherein the likelihood ratio test statistic is a type 1 error value.

8. The computer-implemented method of claim 1, wherein the new value, the valid data, and the invalid data are associated with at least one of a same person, a same company, or a same item.

9. The computer-implemented method of claim 1, wherein taking the one or more actions to correct the new value comprises at least one of:
   indicating, to a user, that the new value is invalid; or
   correcting the new value based on the valid data associated with the data field.

10. An apparatus, comprising:
   a memory comprising computer-executable instructions; and
   a processor in data communication with the memory and configured to execute the computer-executable instructions and cause the apparatus to perform a method for detecting data entry errors, the method comprising:
      receiving a new value as user input for a data field;
      generating a first histogram-based approximation of a first kernel density estimate generated based on valid data associated with the data field and a second histogram-based approximation of a second kernel density estimate generated based on invalid data associated with the data field;
      determining a first likelihood that the new value is valid, wherein the first likelihood is equal to a first probability density of a first bin of the first histogram-based approximation that includes a log ratio of the new value to a mean value associated with the data field;
      determining a second likelihood that the new value is invalid, wherein the second likelihood is equal to a second probability density of a second bin of the second histogram-based approximation that includes the log ratio of the new value to the mean value associated with the data field;
      computing a likelihood ratio test statistic based on a ratio of the first likelihood that the new value is valid to the second likelihood that the new value is invalid;
      classifying the new value as valid or invalid based on comparing the likelihood ratio test statistic to a likelihood ratio test threshold; and
      when the new value is classified as invalid, taking one or more actions to correct the new value.

11. The apparatus of claim 10, wherein the method further comprises, prior to receiving the new value as the user input for the data field:
   determining mean values for the valid data associated with the data field;
   determining a log ratio of each individual valid datum in the valid data to a corresponding mean value of the mean values determined for the valid data;
   generating invalid data associated with the data field;
   determining a log ratio of each individual invalid datum in the invalid data to a corresponding mean value of the mean values determined for the valid data; and
   generating the first kernel density estimate based on applying a kernel function to the log ratio of each individual valid datum in the valid data; and
   generating the second kernel density estimate based on applying the kernel function to the log ratio of each individual invalid datum in the invalid data.

12. The apparatus of claim 11, wherein the mean values for the valid data and the mean values for the invalid data are determined via a simple moving average technique, a weighted moving average technique, an exponential weighting technique, or an exponential smoothing technique.

13. The apparatus of claim 11, wherein the kernel function comprises a Gaussian kernel.

14. The apparatus of claim 11, wherein the method further comprises:
   determining the mean value associated with the data field; and
   computing the log ratio of the new value to the mean value.

15. The apparatus of claim 10, wherein taking the one or more actions to correct the new value comprises at least one of:
   indicating, to a user, that the new value is invalid; or
   correcting the new value based on the valid data associated with the data field.

16. The apparatus of claim 10, wherein at least one of the first histogram-based approximation or the second histogram-based approximation comprises variable bin width sizes.

17. The apparatus of claim 10, wherein the likelihood ratio test statistic is a type 1 error value.

18. The apparatus of claim 10, wherein the new value, the valid data, and the invalid data are associated with at least one of a same person, a same company, or a same item.

* * * * *